United States Patent [19]

Starkey

[11] Patent Number: 4,998,875
[45] Date of Patent: Mar. 12, 1991

[54] MOLD WITH SLIDE RETAINER

[75] Inventor: Donald R. Starkey, Norridge, Ill.

[73] Assignee: D & L Incorporated, Norridge, Ill.

[21] Appl. No.: 486,518

[22] Filed: Feb. 28, 1990

[51] Int. Cl.⁵ .................... B29C 45/26; B29C 45/14
[52] U.S. Cl. .................... 425/577; 249/122;
249/160; 403/154; 411/512; 411/907;
425/DIG. 5
[58] Field of Search .............. 403/154, 155; 411/907;
425/512, 577, 527, 528, 529, 542, DIG. 5;
249/160, 161, 83, 68, 122

[56] References Cited

U.S. PATENT DOCUMENTS

| | | | |
|---|---|---|---|
| 3,438,664 | 4/1969 | Meyer | 411/529 |
| 3,807,885 | 4/1974 | Coski | 411/528 |
| 3,811,645 | 5/1974 | Feist | 425/DIG. 58 |
| 4,113,397 | 9/1978 | Snyder | 403/154 |
| 4,472,097 | 9/1984 | Kiefer et al. | 411/907 |
| 4,515,342 | 5/1985 | Boskovic | 249/122 |

Primary Examiner—Willard Hoag
Attorney, Agent, or Firm—Fitch, Even, Tabin & Flannery

[57] ABSTRACT

A multipart mold having a resilient retainer engageable with a pin attached to a mold part to hold the mold part in a desired position relative other mold parts.

3 Claims, 1 Drawing Sheet

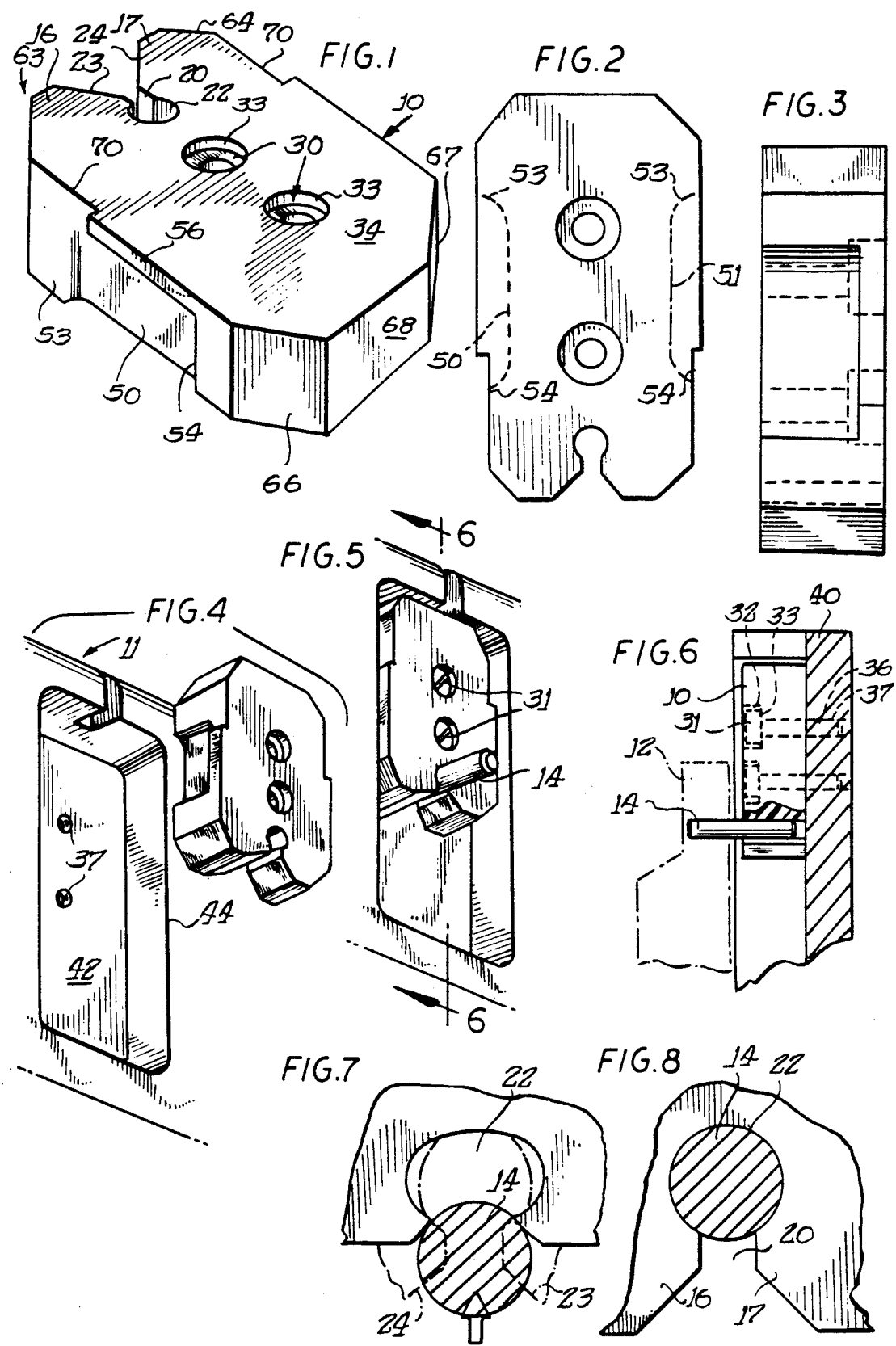

MOLD WITH SLIDE RETAINER

BACKGROUND OF THE INVENTION

This invention relates to an improved slide retainer and positioner used in an injection mold to hold a core part or a mold slide in an outward position when the mold is open.

DESCRIPTION OF THE PRIOR ART

The present invention is directed to an improved slide retainer and positioner to hold a core part affixed to a slide at a predetermined location when the mold is in its open position. More specifically, as disclosed in U.S. Pat. No. 3,811,645, a conventional slide retainer comprises a pair of pivoted, spring-biased jaws that grip a pin fixed on the mold slide to hold the pin and the mold slide at a given position while the mold is open and as the mold begins to close and the jaws are forced apart to release their grip on the pin. The jaws are pivoted intermediate their ends by a common pivot stud. A preloaded compression spring is positioned between the outer ends of the jaws to urge the jaws to their closed gripping position. The inner ends of the pivoted jaws have inclined cam surfaces which are abutted by the incoming pin to force the jaws apart, and in so doing, force the compression spring to be shortened. As the pin leaves the jaws the spring elongates. Injection molds are cycled at high rates and over long periods of time and hence, the springs are likewise cycled and sometimes break.

The retainer thus serves to retain the slide and attached core element at an outward position spaced from another cam which is often in the shape of pins extending obliquely within the mold. Should the springs break and allow the retainer and the slide to move to a position out of alignment, a great amount of damage can be done to the mold parts themselves when the mold is closed to its closed position. Typical injection molding occurs very quickly and over large numbers of cycles. For example, the life of 250,000 cycles or more is often required for such springs. The stressing of springs sometimes causes them to fail because of inherent defects in the spring material or because of fatigue or other factors which may cause the springs to break. Another shortcoming of the present retainers is their relative high cost because they include the two jaw parts, a common pivot and a separate spring, all of which are different pieces, each having its own cost and requiring its assembly when making the retainer.

Accordingly, an object to the present invention is to provide a new and improved slide retainer.

A further object of the invention is to provide a new and improved one-piece slide retainer.

SUMMARY OF THE INVENTION

In accordance with the present invention, the compression springs and the separately-pivoted metal jaws used in the prior art have been replaced by a single one-piece retainer of plastic material which has a pair of integral jaws which do the clamping of a pin connected to a slide or to the core part in a mold.

More specifically, the preferred retainer comprises a small, one-piece integral body of polyurethane plastic which has at one end a pair of inclined or cam surfaces leading to a narrow necked slot. The pin will cam along the inclined surfaces and force the narrow necked slot to a wider width to permit the passage of the pin therethrough and into an enlarged retainer opening connected to the slot. The pin will remain within the opening until the mold is to be closed, and the closing of the mold will cause the pin to retrace its route through the necked slot, thereby flexing the integral jaws apart as the pin leaves the retainer. The retainer is provided with means for facilitating its connection to the mold preferably in the form of openings which receive fasteners such as bolts to connect the retainer in the mold. To facilitate the flexing of the sides of the jaws, relief areas are formed on the sides of the block adjacent the jaws to reduce the cross-sectional thickness of the block adjacent the jaws.

BRIEF DESCRIPTION OF THE DRAWINGS

As shown now for purposes of illustration, the invention is embodied in a structure shown in the accompanying drawings in which:

FIG. 1 is a isometric view of a retainer constructed in accordance with the preferred embodiment of the invention;

FIG. 2 is a plan view of the block retainer of FIG. 1;

FIG. 3 is a side elevational view of the retainer of FIG. 2;

FIG. 4 is an exploded view showing the retainer to be positioned within a cavity of a mold;

FIG. 5 shows the retainer secured in position in the mold and a pin from a mold slide;

FIG. 6 illustrates a sliding mold part and a pin thereon which is being retained by a retainer, and is a cross-sectional view taken substantially along the line 6—6 of FIG. 5;

FIG. 7 is an enlarged view of a pin flexing the jaws;

FIG. 8 is an enlarged view showing the pin being retained by the jaws of the retainer.

DETAILED DESCRIPTION OF THE PREFERRED EMBODIMENT

The present invention is directed to a retainer 10 for use in a mold 11 to retain in position a sliding mold part or core element 12 which in its open position of FIG. 6 brings a pin 14 affixed thereto into gripping relationship with a pair of jaws 16 and 17 on the retainer 10.

As described in the aforementioned U.S. Pat. No. 3,811,645, the molds often contain laterally-movable, mold slides 12 which have on them a core element which projects into the mold cavity and which moves laterally as the mold is opened and the mold halves move apart to allow ejection of the molded part. The description of a typical mold and all of the elements used in the mold is disclosed in U.S. Pat. No. 3,811,645, which is hereby incorporated by reference if fully reproduced herein.

As disclosed in that Patent and particularly as illustrated in FIGS. 6 and 7 thereof, the conventional retainer had a pair of separate discrete metal jaw members, each of which had a pivot or clevis portion with a common pivot pin joining them at a portion intermediate the ends of the jaw elements. The jaw elements had a pair of jaws at an inner end which were to grip the pin attached to the mold part. A coiled spring was positioned between opposite legs and opposite ends of the jaw members; and it was a compression spring which spring-urged the jaws to their normally-closed position. The spring is a small compression spring made of metal which has a limited cycle life and which was subject to breaking. The breaking of a spring could cause misalignment of parts within the mold and consequent damage to the mold when the misaligned parts are closed. Further, the slide retainers are relatively costly in that they comprise at least four elements including a pair of jaw members, the pivot pin and the compression spring.

In accordance with the present invention, there is provided a new and improved slide retainer which is a one-piece plastic body made of polyurethane which has sufficient holding power to hold a slide part with the same holding power provided by the spring-biased grippers of the prior art. The particular slide retainer is formed of a tough, strong, plastic material such as polyurethane and is configured so as to be secured in the mold in the same places and locations that previously accepted the prior art retainers herein described. The preferred retainer has a pair of integral jaws 16 and 17 which are separated by a narrow necked slot 20, which extends and leads into an enlarged retaining opening 22 which is sized to receive the pin 14 as best seen in FIG. 8. To facilitate the outward pivoting of the jaws, there are a pair of inclined cam surfaces 23 and 24 on the jaws which converge to the necked slot 20 so that the pin is guided to the necked slot through the necked slot into the opening 22.

The one-piece block is a very simple piece compared to the four pieces of the prior art retainer and is much less expensive in that it does not have all of the metal parts and need not be assembled to form a retainer. The retainer has surprisingly been found to have a very long cycle life and can easily go over 500,000 or more cycles of flexing without breaking.

Referring now in greater detail to the preferred and illustrated embodiment of the invention, the block 10 is provided with means for securing the block into the mold which includes the openings 30 in the block which receive threaded bolts 31 (FIG. 6) which have heads 32 disposed in countersunk, enlarged bores 33 adjacent top surface 34 of the block. The bolts have threaded shanks 36 threaded into bores 37 (FIG. 6) in the stationary mold block 40. The mold block 40 has a recess or groove 42 which is depressed from an upper surface 44 of the mold block into which is placed the retainer 10. Then, the bolts 31 are used to fasten the retainer into position in the stationary mold block 40, as illustrated in FIGS. 5 and 6. A retainer may be easily replaced by unthreading the bolts and removing the old retainer 10 and inserting a new retainer in the groove.

The gripping jaws 16 and 17 are helped in their flexing as the pin 14 enters through the necked slot 20 by providing relief areas 50 and 51 on opposite sides thereof. The particular relief areas are areas of reduced plastic and extend from a forward, vertical shoulder 53 to a rear, vertical shoulder 54. It is preferred to have a top, flat, narrow web 56 of plastic over the top of the recessed relief 50 and 51 so as to prevent the accumulation of dirt or other materials within the reliefs 50 or 51. The reliefs provide areas of reduced cross-sectional thickness between the shoulders 53 of the relief and the opening 22. The reduced cross-section facilitates bending or flexing at these locations.

The gripping jaws are also relieved at their forward outer sides 70 to assure that these sides of the jaws do not abut the sidewalls of the mold and experience compression forces by the mold sidewalls as the pin 14 spreads the jaws to their maximum extent. Without the relief, the jaws hit the mold sidewalls and experience compression forces. The illustrated relief areas are 0.050 inch in depth.

In addition to the inclined surfaces 23 and 24 on the gripper jaws, it is preferred that they also have narrow, inclined, tapered, vertical surfaces 64 and 65 at the front or the end 63. A pair of inclined surfaces 66 and 67 are also formed at the opposite end 68 of the block.

By way of example only, the preferred and illustrated retainer is relatively a small block which measures only several inches and comes in approximately three different sizes at present. Obviously, the particular sizes can be varied as well as can be the shapes. The illustrated blocks, for instance, come in lengths of 1.651 inches, 2.23 inches and 3.49 inches. The widths for these three blocks are 0.980, 1.480 and 1.980 inches. The thickness of the block from the top surface to the bottom surface is typically about only ⅜ inch in thickness. By way of example, the necked slot 20 may be as small as 0.122 inch. The opening 22 for the receiving the pin 14 is usually about ¼ inch and receives and retains a pin which is 0.25 inch in diameter. The reliefs 50 and 51 are about 0.8 inches in length, and about 0.2 inches in depth. The small web on web 56 is about ⅛ inch in thickness. Manifestly, these dimensions are given by way of example only, and these dimensions may change considerably depending upon the installation involved.

The preferred and illustrated blocks are formed from a solid slab of 90 Shore A durameter or 95 Shore A durameter polyurethane. This type of polyurethane has a good flexibility and generally is a non-compressible material, which means that its volume remains substantially constant under force but changes it shape. The preferred polyurethane is considered to be similar to a solid fluid with a memory in that the polyurethane produces a high, uniform and continuous counter-pressure to return to its original shape when the mold force is released. The particular polyurethanes are available, a number of which are used as springs or strippers and some of which are sold under the Trademark LAMINA or LAMI-FLEX.

As shown in FIG. 7, the pin comes into the jaws and slides along inclined surfaces 23 and 24 and pushes them laterally to flex the jaws wider apart so that the pin can move through the narrow necked slot 20 into the opening 22, which is sized to the pin diameter, such as for example, a nominal 0.25 inch diameter for the pin 14. On the other hand, when the pin is pulled back through the narrow necked slot 20, it again forces the jaws to swing apart wide enough to allow it to be removed.

From the foregoing it will be seen there has been provided a new and improved one-piece retainer formed of a plastic material. The preferred retainer is made of polyurethane with a pair of integral one-piece jaws which will flexibly grip and retain a pin of a mold part and which can be flexed and cycled for hundreds of thousandths or a million cycles without breakage. Because the part is made of material which withstands oil and other materials, it is very resilient and has good flex life, it is not subject to breakdown of the retainers which occurred when steel springs broke in the prior art retainers. The retainer is extremely simple and less expensive than the prior art retainers.

What is claimed is:
1. In a mold assembly, the combination comprising:
a slidable mold part,
a fixed mold part,
a pin fixed to the slidable mold part and movable therewith, and a one-piece retainer of plastic secured to the fixed mold part, a pair of flexible integral jaws on the one-piece plastic retainer separated by a gap less in width than the width of the pin, said jaws gripping the pin to hold the slidable part at a predetermined position, said pin flexing the jaws and enlarging the gap to allow the pin to slide through the gap.

2. A mold assembly in accordance with claim 1 in which to the one-piece retainer is a block of polyurethane.

3. A mold assembly in accordance with claim 2 in which relief grooves are formed on sides of the block adjacent the jaws to facilitate flexing of the jaws.

* * * * *